United States Patent Office 3,113,138
Patented Dec. 3, 1963

3,113,138
PREPARATION OF BUTYROLACTONE
Borivoj R. Franko-Filipasic, Lower Makefield Township, Bucks County, Pa., John M. Kolyer, Hightstown, N.J., and Robert E. Burks, Jr., Mountain Brook, Ala., assignors to FMC Corporation, New York, N.Y., a corporation of Delaware
No Drawing. Filed Dec. 20, 1961, Ser. No. 160,893
4 Claims. (Cl. 260—343.6)

This invention relates to the preparation of butyrolactone, and more particularly, to the preparation of butyrolactone by the hydrogenation of succinic anhydride in yields in excess of 80% of theory.

Butyrolactone is commercially prepared at the present time by a 3-step process involving the reaction of acetylene and formaldehyde to produce 2-butyne-1,4-diol. The 2-butyne-1,4-diol is then reduced to 1,4-butanediol, which is catalytically dehydrogenated to butyrolactone.

Several processes have been suggested for preparing butyrolactone by the hydrogenation of maleic anhydride. However, none of these processes have led to butyrolactone in high yield. For example, it was suggested by Cass, in Patent No. 2,867,628, that butyrolactone can be prepared by hydrogenating maleic anhydride which has been adsorbed by a bed of catalyst consisting of palladium deposited on alumina. However, the yield of butyrolactone was less than 20%. The best yield of butyrolactone reported for the hydrogenation of maleic anhydride is found in Patent No. 2,772,292, to McShane et al. They obtained a yield of 74% by hydrogenating maleic anhydride in the presence of Raney cobalt at a temperature of 250° C. and a pressure of 2,000 p.s.i.g. for about 3.5 hours.

It is an object of this invention to prepare butyrolactone in high yield by the hydrogenation of succinic anhydride.

Another object is to provide an economical process for the production of butyrolactone in high yield by the hydrogenation of succinic anhydride under mild reaction conditions and short reaction times.

These and other objects will become apparent from the following description of this invention.

We have now found that butyrolactone can be prepared from succinic anhydride in yields in excess of about 80%, and preferably in excess of about 90%, by hydrogenating succinic anhydride in the liquid phase in the presence of a solvent selected from the group consisting of lower alkyl acetates and dioxane, and a catalyst comprising palladium deposited on a carrier selected from the group consisting of activated carbon and activated alumina, at a pressure of at least about 200 p.s.i.g., while maintaining the temperature in the range of about 30–95° C. until at least a major portion of the reaction has taken place. By this process, the high temperatures and pressures and the long reaction times of the prior art processes are avoided, while at the same time obtaining yields in excess of those heretofore possible.

The hydrogenation of succinic anhydride is illustrated by the following formula:

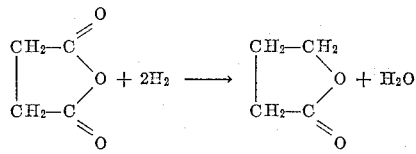

Succinic anhydride is a commercially available solid which is generally prepared by the hydrogenation of maleic anhydride. The reaction is suitably carried out by charging succinic anhydride, solvent and catalyst to an agitated autoclave, and adding hydrogen to maintain the desired pressure. The agitation may be provided by any suitable means such as by using a shaking, rocking or stirred autoclave.

Yields in excess of 80% are obtained by operating in the liquid phase in the presence of specific solvents. The solvents which have been found to be suitable for this reaction include lower alkyl acetates such as methyl acetate, ethyl acetate, propyl acetate, n-butyl acetate, sec.-butyl acetate and amyl acetate, and dioxane. The preferred solvent is ethyl acetate.

The reaction should be carried out in the presence of sufficient solvent to dissolve a significant portion of the succinic anhydride, thereby providing a mobile reaction mixture and a rapid hydrogenation rate. Generally, the solvent should be present in a solvent to succinic anhydride weight ratio in the range of about 0.2–10:1. Preferably, the reaction medium contains about 0.5–5 parts of solvent per part of succinic anhydride.

Any of the commercially available palladium-on-carbon or palladium-on-alumina catalysts may be used. For good results, the catalyst should contain at least about 2% by weight of palladium deposited on activated charcoal or activated alumina. There is no advantage in having more than about 10% palladium deposited on the carrier. Commercial catalysts generally contain about 4–5% palladium. The catalyst should be present in an amount of at least about 4% by weight, based upon the succinic anhydride charged to the reactor. With less than about 4% of catalyst, the yield is somewhat diminished. The preferred amount of catalyst is about 5–9%, however greater amounts may be used, if desired. For example, as much as 100% has been used without any adverse effect. Of course, economic considerations favor lesser amounts.

Temperatures in the range of about 30–95° C. are suitable for carrying out the process of this invention. At temperatures of less than about 30° C. the reaction is rather slow and does not proceed to completion. Care should be taken to avoid temperatures as high as 100° C. until at least a major portion of the reaction has taken place, since the catalyst is poisoned by substantial quantities of succinic anhydride at these higher temperatures. If a heat-up procedure is used, in which the temperature is allowed to slowly rise from ambient temperature to some temperature in excess of 95° C., a major portion of the reaction should take place before the temperature reaches 100° C. Preferably, the reaction is carried out at temperatures of about 40–80° C.

Although variations in pressure do not have a great effect upon the reaction, pressures of at least about 200 p.s.i.g. should be used. Pressures in the range of about 500–2,000 p.s.i.g are preferred, although pressures in excess of 2,000 p.s.i.g. may be used, if desired, without adverse effect.

An especially economical method for preparing butyrolactone is a 2-step process starting with maleic anhydride. By this process, maleic anhydride, solvent, catalyst and hydrogen are charged to the autoclave and allowed to react at ambient temperature and elevated pressure. The reaction proceeds smoothly to form quantitative amounts of succinic anhydride in about 1 hour. The autoclave is then opened and an additional quantity of fresh catalyst is added, the autoclave is again pressurized with hydrogen and butyrolactone is formed in good yield under the conditions described above for the hydrogenation of succinic anhydride.

The following examples, illustrating the novel method disclosed herein for preparing butyrolactone, are presented without any intention that the invention be limited thereto. All parts and percentages are by weight.

Example 1

One hundred parts of succinic anhydride, 400 parts of ethyl acetate and 8 parts of 4.5% palladium-on-carbon powder were charged to a stainless steel, rocking autoclave. The temperature was brought to 75° C. and agitation was begun. Hydrogen was charged to the autoclave at a pressure of 1,060–1,560 p.s.i.g. and hydrogenation took place for 50 min. while the temperature was maintained at 75° C. The reaction mixture was then filtered to remove catalyst, and distilled at atmospheric pressure to remove ethyl acetate and water. The product residue was then distilled at reduced pressure to give 80 parts of a fraction boiling at 90–91° C. at 17 mm. Hg. This fraction was analyzed by vapor phase chromatography and found to contain 94% of the theoretical amount of butyrolactone.

Examples 2–10

Additional examples were carried out following the procedure of Example 1, except for differences in the catalyst, catalyst loading, solvent, solvent ratio, temperature, pressure and time, as noted in the following table. Example 10 was carried out by slowly heating up the autoclave from ambient temperature to about 205° C. After 14 min., the reaction temperature reached 95° C. at which point the reaction was about 65% complete.

The following table gives the data for Examples 1–10:

| Example | Catalyst | Catalyst, percent on feed | Solvent | Solvent/Feed Ratio | Temp., °C. | Hydrogen Pressure, p.s.i.g. | Time, min. | Butyrolactone Yield, percent of theory |
|---|---|---|---|---|---|---|---|---|
| 1 | Pd/C | 8 | ethyl acetate | 4 | 75 | 925–1,530 | 65 | 94 |
| 2 | Pd/Al$_2$O$_3$ | 8 | ___do___ | 4 | 50 | 1,000 | 60 | 90 |
| 3 | Pd/C | 8 | ___do___ | 4 | 35–95 | 250–500 | 60 | 86 |
| 4 | Pd/C | 8 | ___do___ | 1 | 75 | 990–1,395 | 60 | 89 |
| 5 | Pd/C | 4 | ___do___ | 4 | 50 | 1,000 | 60 | 81 |
| 6 | Pd/C | 50 | ___do___ | 4 | 50–70 | 1,275 | 9 | 85 |
| 7 | Pd/C | 100 | ___do___ | 4 | 75 | 700–1,410 | 40 | 84 |
| 8 | Pd/C | 8 | n-butyl acetate | 2 | 28–82 | 905–1,440 | 70 | 90 |
| 9 | Pd/C | 8 | methyl acetate | 4 | 70 | 1,275 | 105 | 86 |
| 10 | Pd/C | 8 | dioxane | 4 | 30–205 | 1,525 | 60 | 82 |

Example 11

This example illustrates a 2-step process for preparing butyrolactone from maleic anhydride. One hundred parts of maleic anhydride, 400 parts of ethyl acetate and 0.2 part of 4.5% palladium-on-carbon powder were charged into a stainless steel, rocking autoclave. Agitation was begun and hydrogen was added without applying heat. The external temperature of the autoclave was 22° C. at the beginning and rose exothermally to a maximum of 25° C. The hydrogenation was continued for 65 min. at 810–1,160 p.s.i.g. The autoclave was then opened, 8.2 parts of fresh catalyst was added, and the hydrogenation was continued at 50° C. and 855–1,160 p.s.i.g. for 75 min. The product was worked-up as set forth in Example 1 to give 83.5 parts of a fraction boiling at 89° C. at 17 mm. Hg. This fraction was analyzed by vapor phase chromatography and found to contain 94% of the theoretical amount of butyrolactone.

As will be apparent to those skilled in the art, numerous modifications and variations of the catalysts, solvents, temperatures and pressures illustrated above may be made without departing from the spirit of the invention or the scope of the following claims.

We claim:

1. The improved method of preparing butyrolactone which comprises hydrogenating succinic anhydride in the liquid phase in the presence of a solvent selected from the group consisting of lower alkyl acetates and dioxane, and a catalyst comprising palladium deposited on a carrier selected from the group consisting of activated carbon and activated alumina, at a pressure of at least 200 p.s.i.g., while maintaining the temperature in the range of 30–95° C. until at least a major portion of the reaction has taken place.

2. The improved method of preparing butyrolactone which comprises hydrogenating succinic anhydride in the liquid phase in the presence of at least 20% by weight, based upon the succinic anhydride, of a solvent selected from the group consisting of lower alkyl acetates and dioxane, and at least 3% by weight, based upon the succinic anhydride, of a catalyst comprising at least 2% by weight, based upon the catalyst, of palladium deposited on a carrier selected from the group consisting of activated carbon and activated alumina, at a pressure of at least 200 p.s.i.g., while maintaining the temperature in the range of 30–95° C. until at least a major portion of the reaction has taken place.

3. The improved method of claim 2 in which the hydrogenation is carried out in the presence of 0.5–5 parts by weight of ethyl acetate per part of succinic anhydride, and 5–9% by weight, based upon the succinic anhydride, of a catalyst consisting of 4–5% palladium-on-carbon at a pressure of 500–2,000 p.s.i.g. and a temperature of 40–80° C.

4. The improved method of preparing butyrolactone which comprises hydrogenating maleic anhydride in the liquid phase in the presence of a solvent selected from the group consisting of lower alkyl acetates and dioxane, and a catalyst comprising palladium deposited on a carrier selected from the group consisting of activated carbon and activated alumina, to form succinic anhydride, adding an additional amount of the same catalyst, and hydrogenating the succinic anhydride at a pressure of at least 200 p.s.i.g., while maintaining the temperature in the range of 30–95° C. until at least a major portion of the reaction has taken place.

References Cited in the file of this patent

UNITED STATES PATENTS 2,072,861     Amend et al.     Mar. 9, 1937
2,867,628     Cass     Jan. 6, 1959